(12) United States Patent
Rugina

(10) Patent No.: US 8,996,853 B2
(45) Date of Patent: Mar. 31, 2015

(54) PROBING THE BOOT SEQUENCE OF A COMPUTER SYSTEM

(75) Inventor: Radu Rugina, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 233 days.

(21) Appl. No.: 13/593,463

(22) Filed: Aug. 23, 2012

(65) Prior Publication Data

US 2014/0059336 A1 Feb. 27, 2014

(51) Int. Cl.
| | | |
|---|---|---|
| G06F 9/00 | (2006.01) | |
| G06F 9/24 | (2006.01) | |
| G06F 12/14 | (2006.01) | |
| G06F 9/44 | (2006.01) | |
| G06F 11/30 | (2006.01) | |
| G06F 11/34 | (2006.01) | |

(52) U.S. Cl.
CPC .......... *G06F 9/4401* (2013.01); *G06F 11/3003* (2013.01); *G06F 11/3065* (2013.01); *G06F 11/3093* (2013.01); *G06F 11/3476* (2013.01); *G06F 2201/865* (2013.01)
USPC ...................................... 713/2; 713/1; 726/25

(58) Field of Classification Search
USPC ............................................................ 713/2
See application file for complete search history.

(56) References Cited

U.S. PATENT DOCUMENTS

| | | | |
|---|---|---|---|
| 5,764,593 A * | 6/1998 | Turpin et al. ....................... 713/2 |
| 6,289,448 B1 * | 9/2001 | Marsland ........................... 713/2 |
| 7,735,067 B1 | 6/2010 | Leventhal | |
| 7,788,723 B2 * | 8/2010 | Huddleston ...................... 726/24 |
| 7,788,725 B2 * | 8/2010 | Rajendran ....................... 726/25 |
| 8,127,122 B2 * | 2/2012 | Barry et al. ....................... 713/1 |
| 8,386,738 B1 * | 2/2013 | Sun ................................ 711/167 |
| 2006/0242401 A1 * | 10/2006 | Elliger et al. ..................... 713/2 |
| 2007/0180439 A1 | 8/2007 | Sundararajan et al. | |
| 2008/0243969 A1 | 10/2008 | Wintergerst et al. | |
| 2008/0295095 A1 | 11/2008 | Watanabe et al. | |
| 2010/0287541 A1 | 11/2010 | Saunders et al. | |
| 2011/0179162 A1 | 7/2011 | Mayo et al. | |
| 2011/0296110 A1 | 12/2011 | Lilly et al. | |
| 2012/0084778 A1 | 4/2012 | Mall et al. | |
| 2012/0159454 A1 | 6/2012 | Barham et al. | |
| 2013/0326110 A1 | 12/2013 | Tsirkin et al. | |

OTHER PUBLICATIONS

VMware, VProbes Programming Reference for VMware Workstation 6.5, 2008, pp. 1-34.*
Clifford E. Cummings, Simulation and Synthesis techniques for Asynchronous FIFO Design, SNUG, San Jose, 2002.

* cited by examiner

*Primary Examiner* — Suresh Suryawanshi

(57) ABSTRACT

Probes are instrumented into a boot sequence of a computer system to enable probing of the boot sequence. As part of the boot sequence, a value stored in a predetermined storage location within a boot device is read and, if the value indicates that probing of the boot sequence has been enabled, executable code for probing the boot sequence is injected into the boot sequence. Outputs of the probing during the boot process are collected into a buffer and analyzed after the completion of the boot process.

20 Claims, 5 Drawing Sheets

PROBING THE BOOT SEQUENCE OF A COMPUTER SYSTEM

CROSS-REFERENCE TO RELATED APPLICATION(S)

The present application is related to U.S. patent application Ser. No. 13/539,163, filed Jun. 29, 2012 and entitled "Simultaneous Probing of Multiple Software Modules of a Computer System", which is assigned to the same assignee as the present application.

BACKGROUND

The execution of an initial set of operations that a computer system performs when the computer system is powered on is known as "booting." The boot process begins when a computer that has been turned off is turned on again, and ends when the computer is ready to perform its normal operations, typically when system software (e.g., operating system, virtualization software known as a hypervisor, etc.) has been loaded. The sequence of instructions that are executed during this boot process is referred to as a "boot sequence." It should be also recognized that the boot process may begin pursuant to a software reset where power is not interrupted, and may involve steaming in an image of the system software through a network connection, such as in network booting, e.g., PXE boot. Furthermore, the boot process may include more abbreviated forms of booting, such as resume from hibernate. Thus, as used herein, the term "booting" should be interpreted broadly to include any process pursuant to which system software is loaded into memory.

Although various techniques have been developed for probing the performance of a computer system, they cannot be used for dynamically probing a boot sequence of the computer system. For example, DTrace, which is a comprehensive dynamic probing framework for troubleshooting kernel and application problems on production systems in real time, is not capable of probing a boot sequence of the computer system. Another such example is VProbes, developed by VMware, Inc. of Palo Alto, Calif., which enables administrators to dynamically instrument various software modules of virtual machines (VMs) running in a virtualized computer system and gather performance data relating to the instrumented software modules for analysis. Details of VProbes are described in the user's manual available from VMware, Inc. entitled "VMware VProbes User Guide," which is incorporated by reference herein.

SUMMARY

One or more embodiments disclosed herein provide a technique for probing a boot sequence of a computer system. With this technique, boot sequences of both virtualized and non-virtualized computer systems may be probed. In addition, embodiments are applicable to any of the types of booting described above, such as booting pursuant to hard and soft resets, network booting, and resume from hibernate. In the case of booting pursuant to hard and soft resets, and network booting, probing would be performed on the normal boot instruction sequence. In the case of resume from hibernate, probing would be performed on the resume from hibernate instruction sequence.

According to the embodiments, probes are instrumented into a boot sequence of a computer system to enable probing of the boot sequence. As part of the boot sequence, a value stored in a predetermined storage location within a boot device is read and, if the value indicates that probing of the boot sequence has been enabled, executable code for probing the boot sequence is injected into the boot sequence. Outputs of the probing during the boot process are collected into a buffer and analyzed after the completion of the boot process.

A method of probing a boot sequence of a computer system having a processor and memory, according to an embodiment, includes the steps of determining that probing of boot instructions has been enabled, compiling executable code for probing the boot instructions, injecting the executable code into one or more positions in a sequence of the boot instructions, and loading system software of the computer system into memory using the boot instructions into which the executable code has been injected.

A method of probing a boot sequence of a computer system having a processor and memory, according to another embodiment, includes the steps of receiving a script that defines one or more probes for probing boot instructions of a computer system, compiling the probes into byte code, writing a value into a first predetermined location within a storage device to indicate that the probing of boot instructions during the next boot-up process has been enabled, and writing the compiled byte code into a second predetermined storage location within the storage device.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1A:
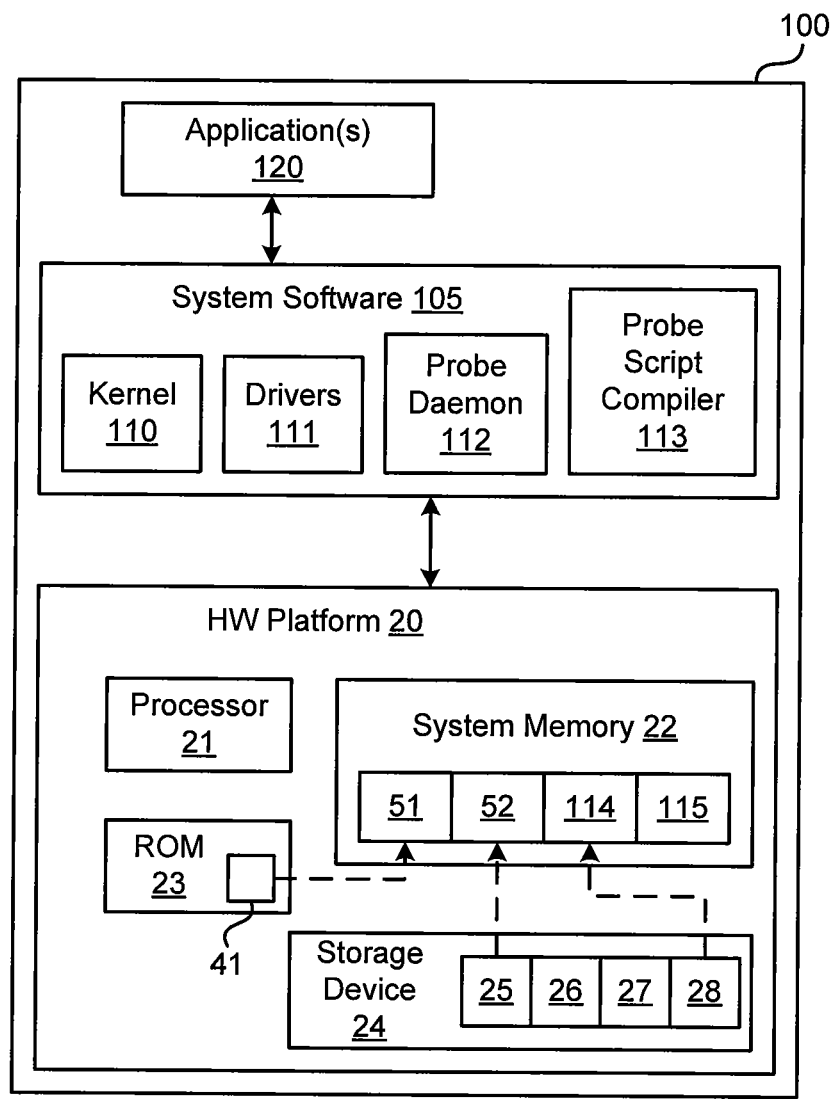
FIG. 1A is a block diagram of one type of computer system in which one or more embodiments may be implemented.

FIG. 1A is a block diagram of a computer system 100 in which one or more embodiments may be implemented. Computer system 100 includes one or more applications 120 (which, in one embodiment, are virtual machines (VMs)) that are running on top of system software 105. System software 105 includes a plurality of software modules including a kernel 110 that manages hardware resources provided by hardware platform 20 through various drivers 111. In one embodiment, system software 105 is an operating system (OS), such as operating systems that are commercially available. In another embodiment, e.g., where VMs are running as applications 120, system software 105 is a hypervisor that may be included as a component of VMware's vSphere® product, which is commercially available from VMware, Inc. of Palo Alto, Calif., that supports virtual machine applications running thereon. Two other components of system software 105, probe daemon 112 and probe script compiler 113, will be described below. Hardware platform 20 includes conventional components of a computer system, such as a processor 21, which may include one or more central processing units (CPUs), system memory 22, read-only-memory (ROM) 23, and a persistent local storage device 24, which may be implemented as a hard disk drive, a solid state drive, or a hybrid drive containing both rotating disks and non-volatile semiconductor memory as the storage media.

When computer system 100 is powered on, processor 21 loads into system memory 22 (in particular, region 51) a boot loader program 41, which is stored in ROM 23, and executes it to boot up the basic input/output system (BIOS) of computer system 100. During this process, various input/output devices are initialized, including the device from which system software 105 is to be booted. In the embodiment described herein, system software 105 is booted from local storage device 24, and local storage device 24 has a predefined storage region 25 in which instructions for booting system software 105 (referred to herein as "boot instructions") are stored. As shown by a dashed line in FIG. 1A, the boot instructions are loaded into a region 52 of system memory 22 in preparation for execution by processor 21. Local storage device 24 also includes a boot probe flag storage region 26 in which a value of "0" is written to indicate that probing of the boot instructions is not desired and a value of "1" is written to indicate that probing of the boot instructions is desired.

Figure 2:
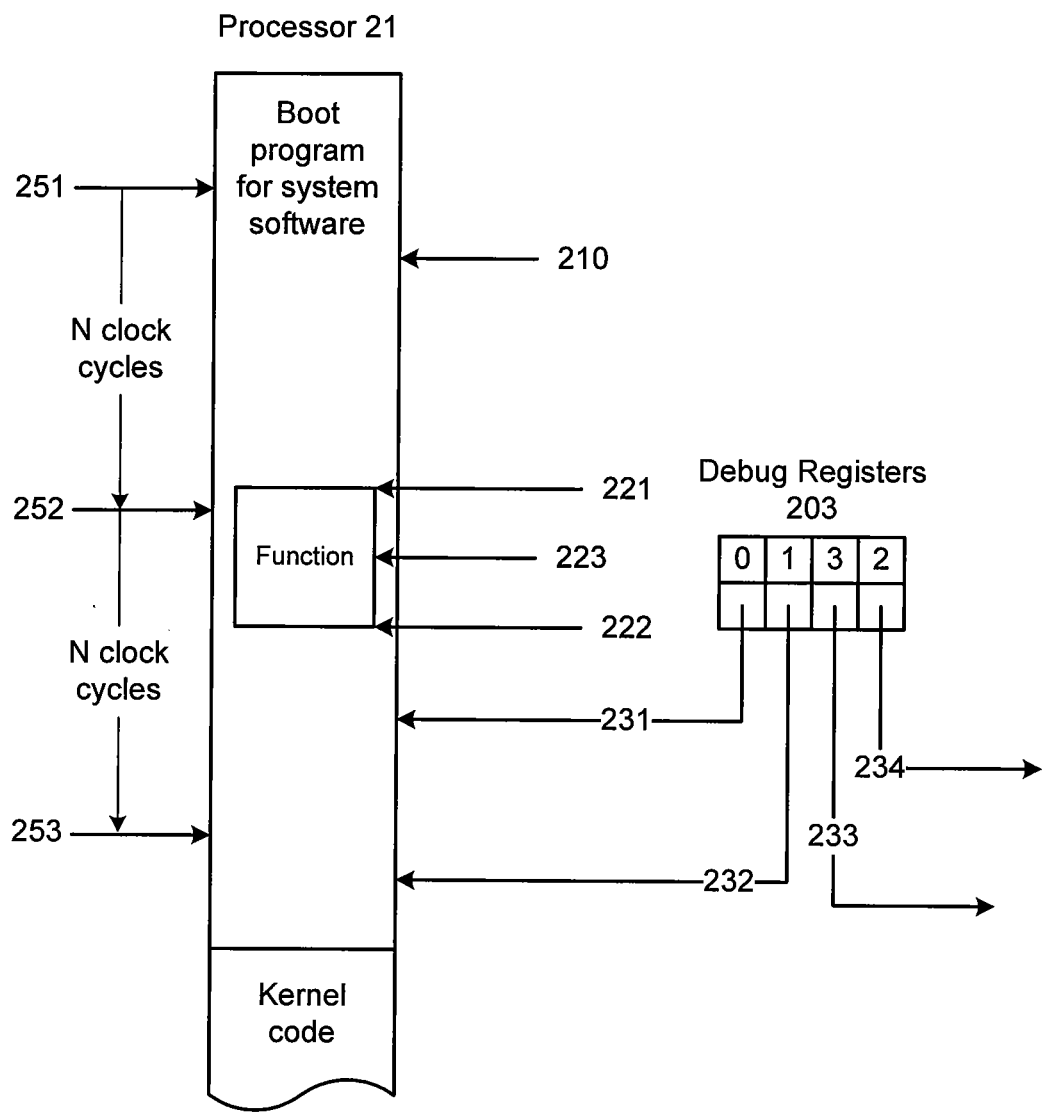
FIG. 2 is a conceptual diagram that illustrates different types of probes that can be injected into a boot sequence.

Additional storage regions 27, 28 are provided in storage device 24 to store byte code for probing the boot instructions, and executable code (referred to herein as the "probe engine") for compiling the byte code into binary code and then injecting the binary code into various positions in the sequence of the boot instructions, respectively. As will be described in further detail below, if during the boot process the boot probe flag is determined to have a value of "1," the executable code stored in storage region 28 of storage device 24 is loaded into region 114 of system memory 22 and executed by processor 21. As a result of this execution, the byte code for probing the boot instructions that is stored in storage region 27 will be compiled into binary code and the binary code will be injected into various positions in the sequence of the boot instructions, as shown in FIG. 2, so that the boot instructions can be probed at these positions. The results of such probing are output to a data buffer 115.

Figure 1B:
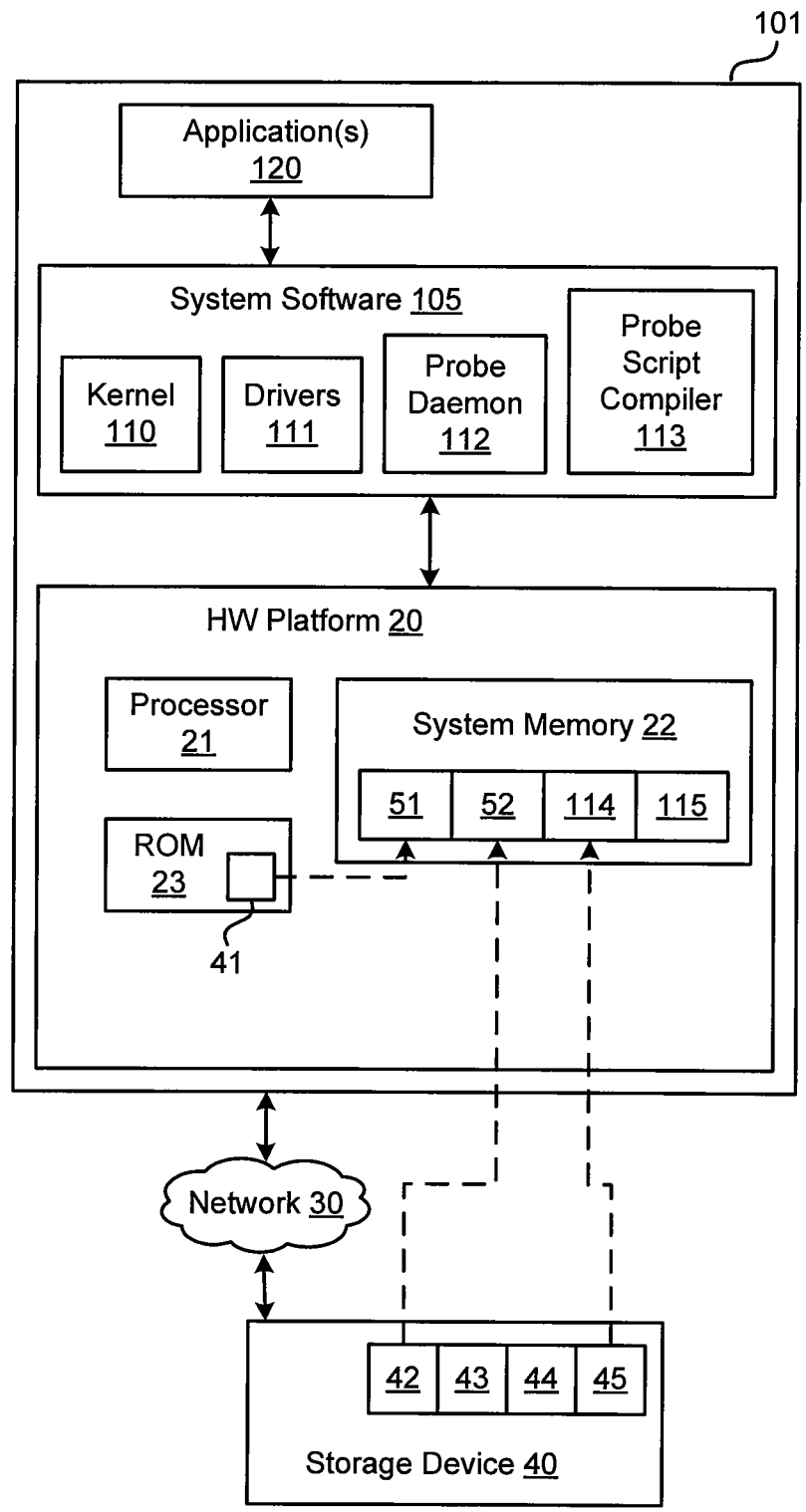
FIG. 1B is a block diagram of another type of computer system in which one or more embodiments may be implemented.

FIG. 1B is a block diagram of a computer system 101 in which one or more embodiments may be implemented. Computer system 101 differs from computer system 100 in that storage is provided by an external storage device 40 that may be implemented as a storage area network (SAN) device or a network-attached storage (NAS) device, which is accessed through a network 30. In addition, external storage device 40 may be configured as a storage device that is shared with one or more other computer systems. As shown in FIG. 1B, external storage device 40 includes storage regions 42, 43, 44, 45 that store the same information as storage regions 25, 26, 27, 28 in local storage device 24, respectively.

Probe daemon 112 functions as an input/output communication interface to a management console (not shown). In the embodiment illustrated herein, probes are deployed when a user loads a probe script into the management console which transmits the probe script to probe daemon 112. Probe daemon 112 is responsible for coordinating the initial compilation of the probe script into byte code using probe script compiler 113. During this initial compilation, the compiler inserts runtime checks in the generated code for infinite loops, bad pointers, and generally any portions that could cause the system to hang or crash. The Emmett compiler referenced in the VMware VProbes User Guide may be used as probe script compiler 113. Probe daemon 112 is also responsible for streaming back the probe output that is collected into data buffer 115 to the management console for analysis by the system administrator.

The probe script includes one or more probes, where each probe defines a domain that it is targeting, a trigger, and a body of code. The domain that is of interest in the embodiments described herein is BOOT. Other domains are described in the VMware VProbes User Guide. The trigger specifies an event of interest in the targeted domain, such as a read, a write, code execution, or a periodic timer tick, and the body of code is executed when the event of interest occurs. Various data types may be defined for the output generated by the probes, such as strings, aggregates, and bags, all of which are further described in the VMware VProbes User Guide.

In the embodiments described above, the storage location of boot loader program 41 in ROM 23 is predefined and known to processor 21 upon power-on of the computer system. In addition, the locations of storage region 25 in storage device 24 and storage region 42 of storage device 40 are predefined and known to boot loader program 41, and the locations of storage regions 26, 27, 28 in storage device 24 and storage regions 43, 44, 45 of storage device 40 are predefined and known to the boot program for system software 105. As a result, upon power-on of the computer system and as part of the boot process, various pre-defined storage locations will be accessed to retrieve code and/or data that affect the execution flow.

FIG. 2 is a conceptual diagram that illustrates different types of probes that can be injected into a sequence of instructions executed in processor 21. In general, there are three classes of probes—static probes, dynamic probes, and periodic probes. Static probes are probes that trigger at predefined points of interest in the targeted domain, e.g., the point of transmission of a network packet or the point of delivery of an interrupt. Dynamic probes are probes that trigger at breakpoints on arbitrary instructions or watchpoints on an arbitrary piece of data. Periodic probes are probes that trigger periodically.

In the example shown in FIG. 2, processor 21 is executing a sequence of instructions, including code for booting system software 105 and code for kernel 110, which is executed after system software 105 has been booted. A static hook is defined at point 210. A probe may be injected into this position (which is statically defined) and executed when the trigger condition for that probe is satisfied. A probe may also be injected at various points in the sequence of instructions that may be dynamically defined by causing an exception and executing the probe as part of the exception handling routine. FIG. 2 illustrates two such examples. In the first example, int3 instruction may be inserted at the beginning of a function (point 221), at the end of a function (point 222), or at a certain byte offset from the beginning of a function (point 223). When the int3 instruction is reached, an exception is raised and a probe is executed in response thereto. In the second example, instruction addresses at various points in the sequence of instructions, e.g., 231, 232, 233, and 234, where probes are to be injected, are stored in debug registers 203, namely DR0, DR1, DR2, and DR3 registers. When any of these instruction addresses are reached, an exception is raised and a probe is executed in response thereto. Finally, periodic probes are shown as probes 251, 252, 253 which are triggered periodically, e.g., every N clock cycles.

Figure 3:
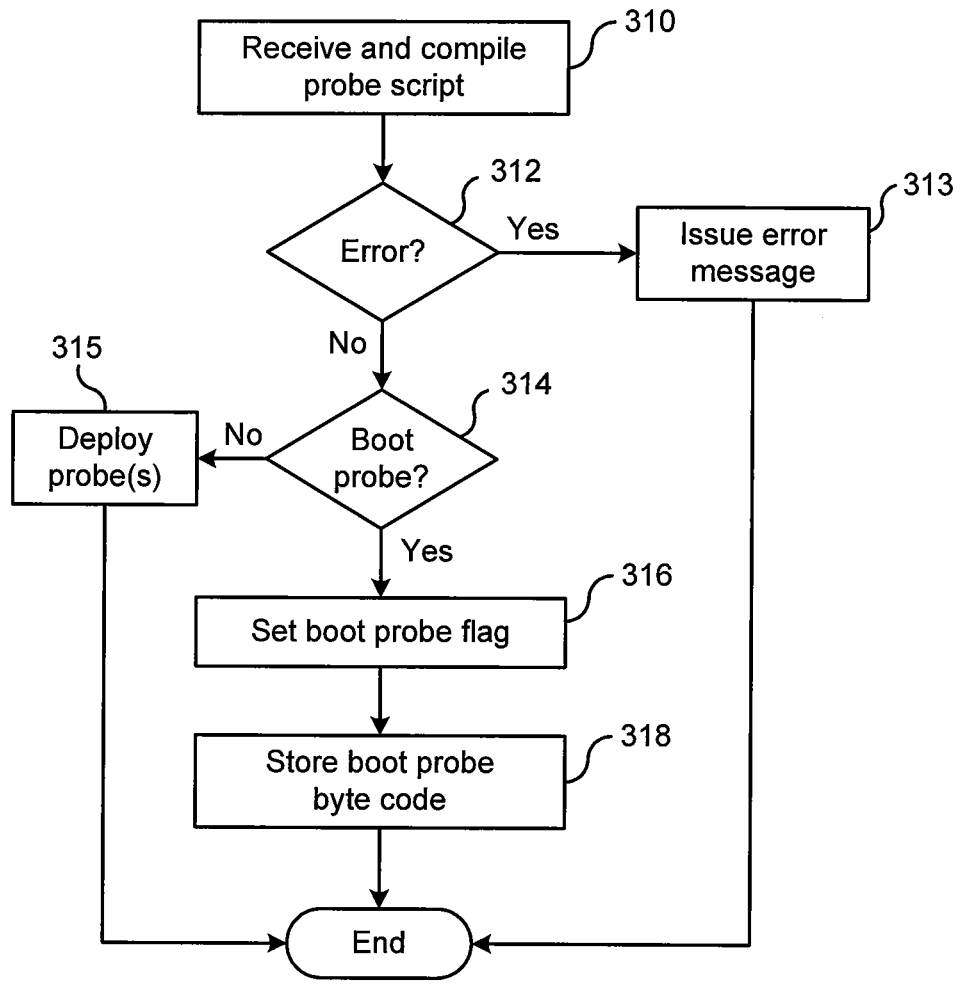
FIG. 3 is a flow diagram that illustrates the steps of a method for deploying a probe for boot instructions according to an embodiment.

FIG. 3 is a flow diagram that illustrates a method for deploying a probe for boot instructions. In the embodiment illustrated herein, this method is being carried out by probe daemon 112 in conjunction with probe script compiler 113 after system software 105 has been booted for the purpose of probing the boot instructions during the next boot process. The method begins at step 310 when a probe script is received by probe daemon 112. In response, probe daemon 112 invokes probe script compiler 113 to compile the probe script into byte code, inserting runtime checks in the generated code for infinite loops, bad pointers, and generally any portions that could cause the system to hang or crash. If it is determined at step 312 that the probe script has errors, an appropriate error message is issued to the management console through probe daemon 112. If there are no errors, probe daemon 112 determines at step 314 whether the domain targeted by the probe script is the BOOT domain. If not, the byte code is handled in accordance with the probe deployment method described in U.S. patent application Ser. No. 13/539,163 (step 315). If the domain targeted by the probe script is the BOOT domain, probe daemon 112 sets the boot probe flag at step 316 by writing a "1" into the boot probe flag storage region (e.g., storage region 26 or storage region 43). Then, at step 318, probe daemon 112 stores the compiled byte code in the byte code storage region (e.g., storage region 27 or storage region 44). The process ends after steps 313, 315, and 318.

Figure 4:
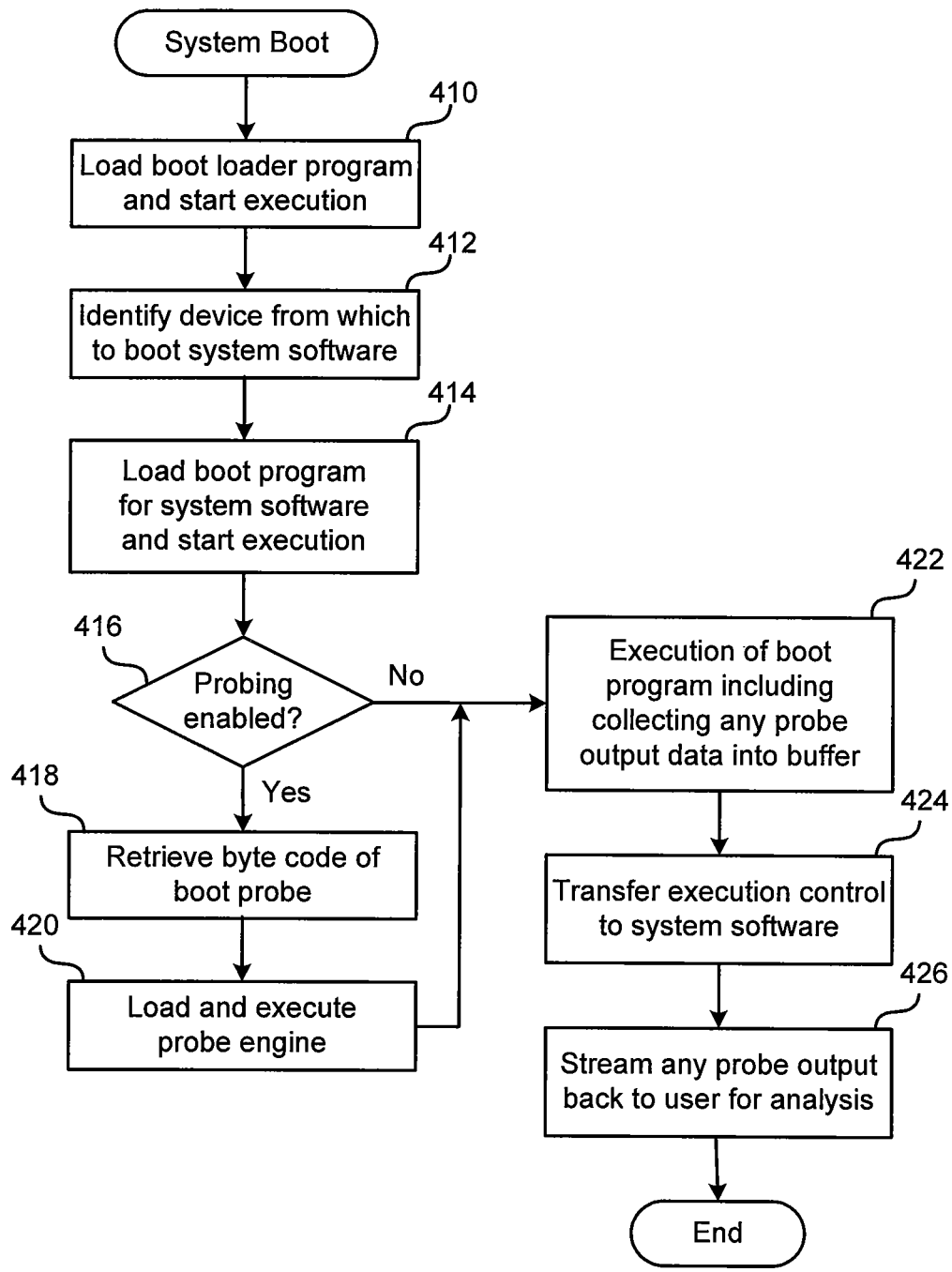
FIG. 4 is a flow diagram that illustrates the steps of a method for probing a boot sequence according to an embodiment.

FIG. 4 is a flow diagram that illustrates a boot process for a computer system and a method of probing boot instructions employed during the boot process. When the computer system is powered on, processor 21 loads into system memory 22 (in particular, region 51) a boot loader program 41, which is stored in ROM 23, and executes it to boot up the basic input/output system (BIOS) of the computer system (step 410). During this process, various input/output devices are initialized, and the device from which system software 105 is to be booted is identified (step 412). In the embodiments described herein, system software 105 is booted from a storage device (either storage device 24 or storage device 40) and the storage device has a predefined storage region (storage region 25 or storage region 42) in which instructions for booting system software 105 are stored. At step 414, these instructions are loaded into region 52 of system memory 22 in preparation for execution by processor 21.

At step 416, processor 21 checks the setting of the boot probe flag. If the boot probe flag has a value of "1," the compiled byte code of the boot probe is retrieved from the byte code storage region at step 418. Then, at step 420, the probe engine is loaded into system memory 22 from the probe engine storage region (e.g., storage region 28 or storage region 45) and executed to compile the byte code into binary code and to inject the binary code into various positions of the sequence of the boot instructions.

Step 422 is executed after step 420 or if the boot probe flag has value of "0." At step 422, the boot program for system software 105 is executed, and any outputs from a probe that has been triggered are stored in data buffer 115. It should be recognized that, as part of step 422, a file system for system software 105 is mounted. Upon completion of the boot program for system software 105, execution control of processor 21 is transferred to system software 105, in particular kernel 110. Then, at step 426, the outputs collected in data buffer 115 are streamed back to the management console through probe daemon 112.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of probing a boot sequence of a computer system having a processor and memory, comprising:
    determining that probing of boot instructions has been enabled;
    compiling executable code for probing the boot instructions;
    injecting the executable code into one or more positions in a sequence of the boot instructions;
    loading system software of the computer system into memory and transferring execution control to the system software;
    collecting outputs of the executable code in a buffer; and
    streaming the outputs collected in the buffer to a predetermined destination for analysis after the execution control has been transferred to the system software,
    wherein said loading the system software includes mounting one or more file systems, and said collecting starts prior to mounting of any file system while said streaming is performed after mounting the one or more file systems.

2. The method of claim 1, further comprising:
    prior to said determining, loading and executing a boot program for input/output devices and identifying one of the devices from which to boot the system software.

3. The method of claim 2, wherein, during said loading, the system software is retrieved from a storage location within the identified device.

4. The method of claim 2, wherein said determining includes:
    reading a value stored in a predetermined storage location within the identified device and determining that the value corresponds to that for enabling the probing of boot instructions.

5. The method of claim 2, further comprising:
    loading a compiler from a predetermined storage location within the identified device after said determining and before said compiling, wherein the compiler is used to perform said compiling.

6. The method of claim 1, further comprising:
    receiving a script that defines a probe for probing of the boot instructions;
    compiling the probe into byte code; and
    writing a value into a first predetermined storage location within a storage device to indicate that the probing of boot instructions has been enabled and writing the compiled byte code into a second predetermined storage location within the storage device.

7. The method of claim 1, wherein the system software is a hypervisor that supports execution of virtual machines in the computer system.

8. A method of probing a boot sequence of a computer system having a processor and memory and being configured with system software, comprising:
    receiving a script that defines a probe to be injected into boot instructions of the computer system for probing the boot instructions;
    compiling the probe into byte code; and
    writing a value into a first predetermined location within a storage device to indicate that the probing of the boot instructions has been enabled and writing the compiled byte code into a second predetermined storage location within the storage device,
    wherein the first and second predetermined storage locations are accessible during a boot process prior to mounting of any of one or more file systems associated with the system software.

9. The method of claim 8, further comprising:
    shutting down the computer system and then powering on the computer system;
    loading and executing a boot program for input/output devices and identifying the storage device as the device from which to boot the system software; and
    loading and executing boot instructions for the system software with or without probing according to the value stored in the first predetermined location of the storage device.

10. The method of claim 9, further comprising:
    prior to said loading and executing the boot instructions for the system software, reading the value stored in the first predetermined location.

11. The method of claim 10, further comprising:
    if the value corresponds to that for enabling the probing of boot instructions, loading a compiler from a third predetermined storage location within the storage device, compiling the byte code into an executable code, and injecting the executable code into one or more positions in a sequence of the boot instructions prior to execution of the boot instructions.

12. The method of claim 10, further comprising:
    if the value corresponds to that for enabling the probing of boot instructions, collecting outputs of the executable code in a buffer prior to execution of the boot instructions, and streaming the outputs collected in the buffer to a predetermined location for analysis after the execution of the boot instructions has completed.

13. The method of claim 12, wherein the system software is a hypervisor that supports execution of virtual machines in the computer system.

14. A non-transitory computer readable storage medium comprising instructions for booting a computer system having a processor and memory, wherein the instructions, when executed in the computer system, cause the computer system to perform a method that includes the steps of:
    determining that probing of boot instructions has been enabled;
    compiling executable code for probing the boot instructions;
    injecting the executable code into one or more positions in a sequence of the boot instructions;
    loading system software of the computer system into memory and transferring execution control to the system software;
    collecting outputs of the executable code in a buffer; and
    streaming the outputs collected in the buffer to a predetermined destination for analysis after the execution control has been transferred to the system software,
    wherein said loading the system software includes mounting one or more file systems, and said collecting starts prior to said mounting while said streaming is performed after said mounting.

15. The non-transitory computer readable storage medium of claim 14, wherein the method further comprises the step of:
    reading a value stored in a predetermined storage location within the device and determining that the value corresponds to that for enabling the probing of boot instructions.

16. The non-transitory computer readable storage medium of claim 14, wherein the method further comprises the step of:
loading a compiler from a predetermined storage location within the device after said determining and before said compiling, wherein the compiler is used to perform said compiling.

17. The non-transitory computer readable storage medium of claim 14, wherein the method further comprises the step of:
prior to said determining, loading and executing a boot program for input/output devices and identifying one of the devices from which to boot the system software.

18. The non-transitory computer readable storage medium of claim 17, wherein, during said loading, the system software is retrieved from a storage location within the identified device.

19. The non-transitory computer readable storage medium of claim 14, wherein the method further comprises the steps of:
receiving a script that defines a probe for probing of the boot instructions;
compiling the probe into byte code; and
writing a value into a first predetermined storage location within a storage device to indicate that the probing of boot instructions has been enabled and writing the compiled byte code into a second predetermined storage location within the storage device.

20. The non-transitory computer readable storage medium of claim 14, wherein the system software is a hypervisor that supports execution of virtual machines in the computer system.

* * * * *